United States Patent
Wang

(10) Patent No.: US 9,138,880 B2
(45) Date of Patent: Sep. 22, 2015

(54) SCREWDRIVER

(71) Applicants: HANGZHOU GREAT STAR TOOLS CO., LTD, Hangzhou, Zhejiang Province (CN); HANGZHOU GREAT STAR INDUSTRIAL CO., LTD, Hangzhou, Zhejiang Province (CN)

(72) Inventor: Weiyi Wang, Hangzhou (CN)

(73) Assignees: HANGZHOU GREAT STAR TOOLS CO., LTD, Hangzhou, Zhejiang Province (CN); HANGZHOU GREAT STAR INDUSTRIAL CO., LTD, Hangzhou, Zhejiang Province (CN)

( * ) Notice: Subject to any disclaimer, the term of this patent is extended or adjusted under 35 U.S.C. 154(b) by 0 days.

(21) Appl. No.: 14/311,023

(22) Filed: Jun. 20, 2014

(65) Prior Publication Data

US 2014/0366278 A1 Dec. 18, 2014

Related U.S. Application Data

(63) Continuation of application No. PCT/CN2012/082630, filed on Oct. 9, 2012.

(30) Foreign Application Priority Data

Dec. 20, 2011 (CN) .......................... 201120535533.1

(51) Int. Cl.
| | | |
|---|---|---|
| B25B 25/00 | (2006.01) | |
| B25F 1/00 | (2006.01) | |
| B25B 15/00 | (2006.01) | |
| B25B 15/02 | (2006.01) | |
| H02G 1/12 | (2006.01) | |
| B25B 23/16 | (2006.01) | |
| B25G 1/08 | (2006.01) | |

(52) U.S. Cl.
CPC . *B25F 1/00* (2013.01); *B25B 15/00* (2013.01); *B25B 15/02* (2013.01); *B25B 23/16* (2013.01); *B25G 1/085* (2013.01); *H02G 1/1212* (2013.01); *H02G 1/1214* (2013.01)

(58) Field of Classification Search
CPC ........... B25F 1/00; B25B 15/00; B25B 23/16; H02G 1/1212; H02G 1/1204; B25G 1/085; H01R 43/033
USPC .......................... 7/108; 81/9.4, 9.43; 30/90.1
See application file for complete search history.

(56) References Cited

U.S. PATENT DOCUMENTS

| | | | |
|---|---|---|---|
| 6,081,953 A * | 7/2000 | Chou ............................... 7/108 |
| 7,225,490 B1 * | 6/2007 | Yen .................................. 7/107 |
| 2004/0025259 A1 * | 2/2004 | Yen .................................. 7/108 |
| 2007/0067996 A1 * | 3/2007 | Chang ............................ 30/90.1 |

FOREIGN PATENT DOCUMENTS

| | | |
|---|---|---|
| CN | 85200969 U | 7/1986 |
| CN | 200957531 Y | 10/2007 |
| GB | 2392318 A | 2/2004 |

OTHER PUBLICATIONS

International Application No. PCT/CN2012/082630 Search Report and Written Opinion dated Jan. 24, 2013.

* cited by examiner

*Primary Examiner* — Lee D Wilson
*Assistant Examiner* — Melanie Alexander
(74) *Attorney, Agent, or Firm* — Conley Rose, P.C.

(57) ABSTRACT

A screwdriver comprises a handle. A wire stripping component is arranged inside the handle; an opening corresponding to a working portion of the wire stripping component is provided on the handle. Owing to the built-in wire stripping component, the screwdriver has the wire stripping function. Also disclosed is a handle applied to the screwdriver.

26 Claims, 9 Drawing Sheets

SCREWDRIVER

CROSS-REFERENCE TO RELATED APPLICATIONS

This application is a continuation of International Application No. PCT/CN2012/082630, filed Oct. 9, 2012, which claims priority to Chinese Application No. 201120535533.1, filed Dec. 20, 2011, both of which are hereby incorporated herein by reference in their entirety for all purposes.

STATEMENT REGARDING FEDERALLY SPONSORED RESEARCH OR DEVELOPMENT

Not applicable.

BACKGROUND

The present invention relates to a screwdriver and a tool handle.

Many tools are stand-alone tools, with relatively simple functions. Such as the traditional screwdriver, which has a primary function of screwing, and the traditional wire stripper, which has a primary function of stripping wires, so that the screwdriver and the wire stripper are independent of each other.

In operation, an electrician sometimes needs to screw screws or connect wires. The tools generally used are screwdriver and wire stripper, and the two tools are separate and need to be carried respectively when the electrician goes to work. The wire stripper has a certain weight, and there are a few more tools that are carried by the electrician, so with one wire stripper an amount of weight is added. If a small-sized wire stripper is used, it is not convenient to find it as it is placed together with other tools, and it is also easy to lose as it is small-sized.

When the electrician works, he needs to connect a lot of wires, so he needs to repeat the work of stripping and screwing. If the wire stripper is used for stripping wires, the electrician has to switch a plurality of times between the screwdriver and wire stripper, which is inconvenient for use. Especially in high places, where times of connecting wires can be great with frequent switching between the screwdriver and wire stripper, so as to cause inconveniency for use.

When the electrician goes to work, the screwdriver is a commonly used tool, which is generally not forgotten; but if the wire stripper is not carried, it might cause trouble for stripping wires when connecting wires. Some unconventional ways may be used, such as peeling with forceps, or peeling with fire which may do damage to wires, which may affect the subsequent operation of circuits. If an operational failure occurs to the circuit, it is not convenient to find the failure point.

China Patent Office issued a CN200957531Y patent on Oct. 10, 2007, named "Slip joint pliers," comprising a left plier, a right plier and a rotary shaft; the front parts of the left plier and the right plier form the head; the rear parts are the handles and the inner sides of the pliers form the jaw; wide teeth and a round wire stripping notch are arranged on the jaw; a steel wire buckle is arranged at the middle of the jaw; a slip clamping jaw is arranged at the rear part of the jaw; a screw driving blade is arranged at each tail end of the handle of left and right pliers and a threaded cap is arranged at each tail end of each plier to cover the screw driving blade. The pliers are used as a screwdriver, but the operation is inconvenient and the screw driving blade is arranged at the tail end of the pliers handle, destroying the insulation of the pliers handle and lowering the safety.

BRIEF SUMMARY OF THE DISCLOSURE

In a first aspect, the present invention provides a screwdriver, comprising a handle having a wire stripping component, said wire stripping component is disposed inside said handle, said handle is provided with an opening corresponding to a working portion of said wire stripping component. The wire stripping component disposed therein enables the screwdriver to have a simultaneous wire stripping function.

In a preferred embodiment, said wire stripping component comprises a first clamp body and a second clamp body cooperating with each other, said first clamp body and a second clamp body are connected together by a first pivot shaft, such that when the first clamp body and second clamp body are cutting, they are in cooperation with one another, for the effect of wire stripping, and moreover, the way that the wire stripping component is produced separately and then is integrally assembled into the handle can be adopted thereby to ensure the working precision of the wire stripping component.

In another preferred embodiment, said handle comprises a moving member, said moving member is connected to said first clamp body, said moving member is disposed to pivot about a second pivot shaft between a first position and a second position, so that said first clamp body pivots about said first pivot shaft, and when said moving member is in said first position, said first clamp and a second clamp body are closed; when said moving member is in said second position, said first clamp and a second clamp body are open.

In another preferred embodiment, an axis of said first pivot shaft and an axis of said second pivot shaft are coincident.

In another preferred embodiment of the present invention, said moving member is provided with a cylindrical portion, said first clamp body is provided with a sliding groove, said moving member and said first clamp body are connected through said cylindrical portion and said sliding groove, and said sliding groove is arranged such that said cylindrical portion can move in said sliding groove to allow said moving member pivot about said second pivot shaft. In another preferred embodiment of the present invention, said sliding groove is arranged on said first clamp body remote from said first pivot shaft.

In another preferred embodiment of the present invention, further comprising a torsion spring, said torsion spring is arranged to bias said moving member to said second position.

In another preferred embodiment of the present invention, when said moving member is in said first position, an outer surface of said moving member is part of an outer surface of said handle. So when wire stripping is not under way, the handle of the screwdriver is the same as a normal screwdriver which is convenient to use.

In another preferred embodiment of the present invention, an outer surface of said handle is a curved surface, which is ergonomic.

In another preferred embodiment of the present invention, when said moving member is in said second position, at least a part of said moving member is projecting beyond the outer surface of said handle.

In another preferred embodiment of the present invention, said handle has a thin portion and a thick portion, said wire stripping component has a narrow portion and a wide portion, and the narrow portion of said wire stripping component is provided at the thin portion of said handle, the wide portion of said wire stripping component is provided at the thick portion of said handle.

In another preferred embodiment of the present invention, said thin portion of said handle is at a side of a head of said handle, said thick portion is at a side of a tail of said handle; the narrow portion of said wire stripping component is at a side of said first pivot shaft, said wide portion is at a free end side of said wire stripping component.

In another preferred embodiment of the present invention, said handle has a thin portion and a thick portion, said wire stripping component has a narrow portion and a wide portion, and the narrow portion of said wire stripping component is provided at the thin portion of said handle, the wide portion of said wire stripping component is provided at the thick portion of said handle, said thin portion of said handle is at a side of the head of said handle, said thick portion is at a side of the tail of said handle; the narrow portion of said wire stripping component is at a side of said first pivot shaft, said wide portion is at a free end side of said wire stripping component, said sliding groove is provided at said wide portion of said wire stripping component.

In another preferred embodiment of the present invention, further comprising a locking component for locking said moving member in said first position.

In another preferred embodiment of the present invention, said working portion comprises one or multiple pairs of semicircular blades provided on said first clamp body and said second clamp body.

In another preferred embodiment of the present invention, said working portion comprises multiple pairs of semicircular blades of different sizes provided on said first clamp body and said second clamp body, and said semicircular blades disposed closer to said first pivot shaft have a larger size.

In another aspect of the present invention, a tool handle is provided comprising a handle having a wire stripping component and a framework, said framework comprises a first chamber, said wire stripping component is held in said first chamber, said handle has an inner space, said framework snap-fitted in said inner space of said handle, openings are provided on side walls of said handle and said framework, respectively, corresponding to a working portion of said wire stripping component.

In another preferred embodiment of the present invention, said wire stripping component comprises a first clamp body and a second clamp body cooperating with each other, said first clamp and said second clamp body are connected together by a first pivot shaft.

In another preferred embodiment of the present invention, said handle comprises a moving member, said moving member is connected to said first clamp body, said moving member is disposed to pivot about a second pivot shaft between a first position and a second position, so that said first clamp body pivots about said first pivot shaft, and when said moving member is in said first position, said first clamp and a second clamp body are closed; when said moving member is in said second position, said first clamp and a second clamp body are open.

In another preferred embodiment of the present invention, said moving member is provided with a cylindrical portion, said first clamp body is provided with a sliding groove, said moving member and said first clamp body are connected through said cylindrical portion and said sliding groove, and said sliding groove is arranged such that said cylindrical portion can move in said sliding groove to allow said moving member to pivot about said second pivot shaft.

In another preferred embodiment of the present invention, further comprising a torsion spring, said torsion spring is arranged to bias said moving member to said second position.

In another preferred embodiment of the present invention, said framework further comprises a second chamber, said locking component is held in said second chamber, for locking said moving member in said first position.

In another aspect of the present invention, a screwdriver is provided, comprising a handle having a wire stripping component provided therein, said wire stripping component comprises a first clamp body and a second clamp body cooperating with each other, said handle further comprises a moving member, said moving member can move between a first position and a second position, so that said first clamp body and said second clamp body are closed and opened, and when said moving member is in said first position, said first and second clamp body are closed; when said moving member is in said second position, said first clamp and said second clamp body is opened, characterized in that when said moving member is in said first position, an outer surface of said moving member is part of an outer surface of said handle.

In another preferred embodiment of the present invention, the outer surface of said handle is curved.

In another preferred embodiment of the present invention, when said moving member is in said second position, at least a part of said moving member is projecting beyond the outer surface of said handle.

In another preferred embodiment of the present invention, further comprising a torsion spring, said torsion spring is arranged to bias said moving member to said second position In another preferred embodiment of the present invention, further comprising a locking component for locking said moving member in said first position.

BRIEF DESCRIPTION OF THE DRAWINGS

In conjunction with the following drawings, the present inventive concept, the specific structure and the resulting technology is further described effect to fully understand the object of the present invention, features and effects.

DETAILED DESCRIPTION OF THE PREFERRED EMBODIMENTS

Figure 1:
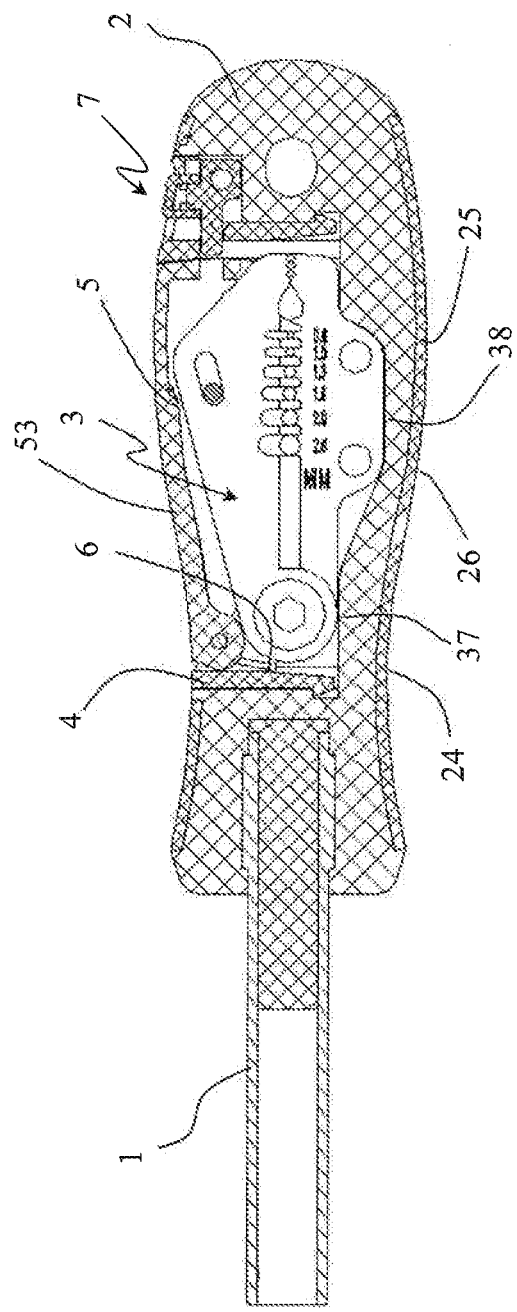
FIG. 1 is a cross sectional view of a screwdriver according to the present invention.
Figure 2:
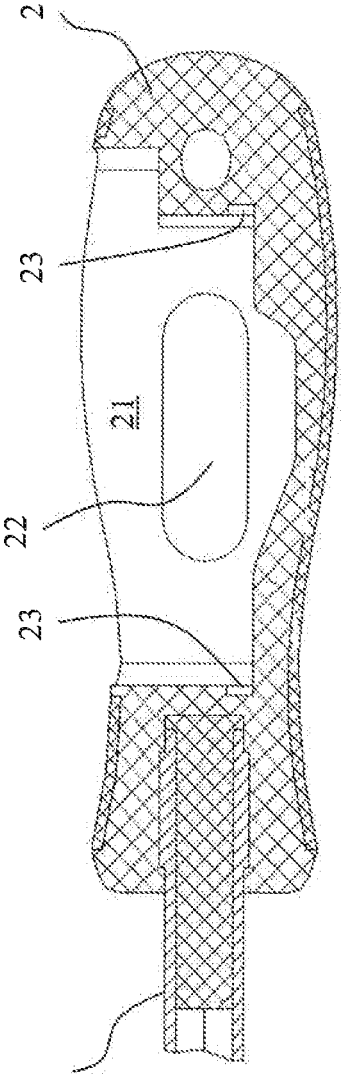
FIG. 2 is a cross sectional view of a handle of a screwdriver according to the present invention.
Figure 3:
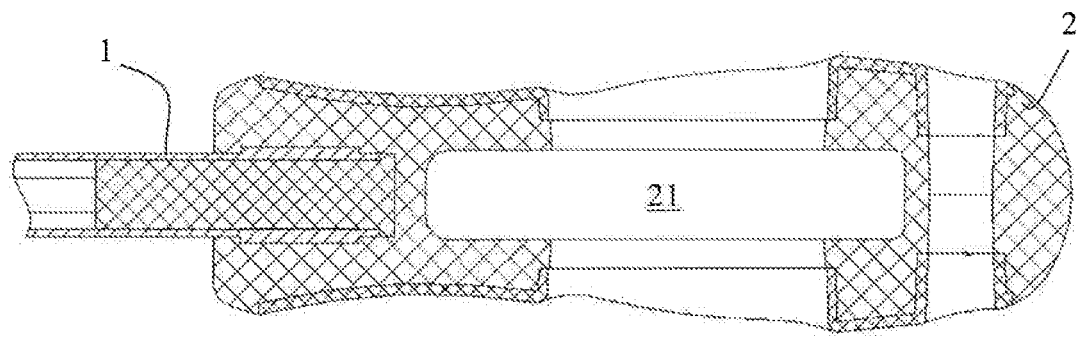
FIG. 3 is a plan view of the handle shown in FIG. 2 of the present invention.

FIG. 1 and FIG. 2 show a preferred embodiment according to the present invention. In the figures, 1 is a rod of the screwdriver, 2 is a handle of the screwdriver. An inner space 21 is provided in handle 2. A wire stripping component 3 is disposed in the inner space 21 of the handle.

Figure 4:
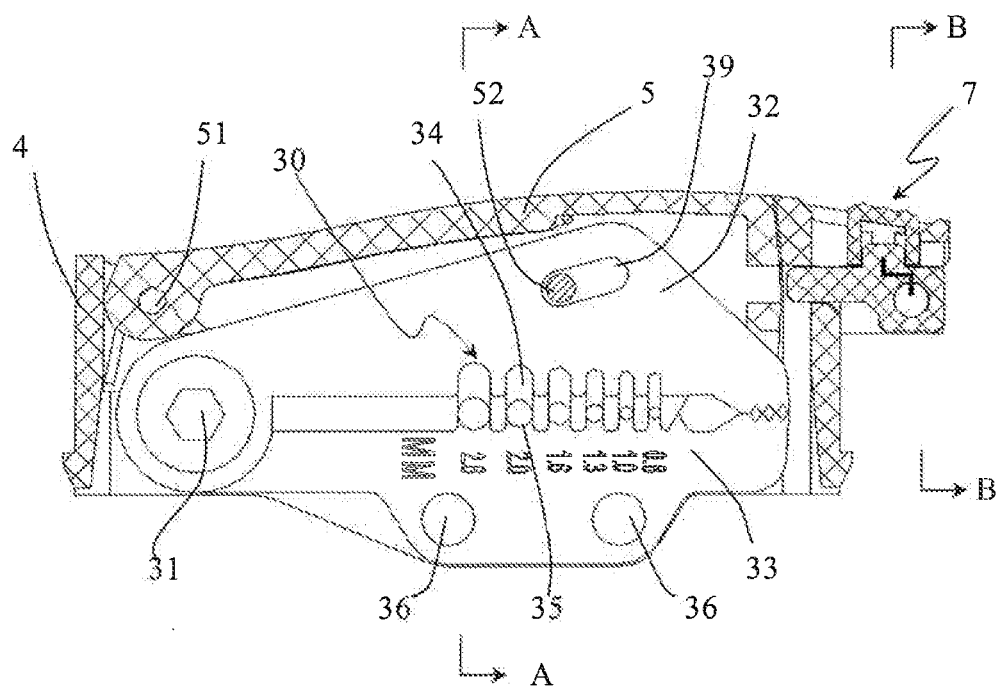
FIG. 4 is a cross sectional view of a wire stripping component according to the present invention.
Figure 5:
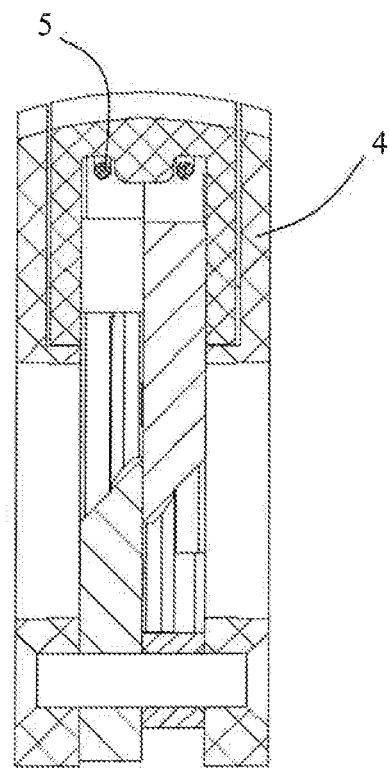
FIG. 5 is a cross sectional view of a structure shown in FIG. 4 of the present invention taken along line A-A.
Figure 6:
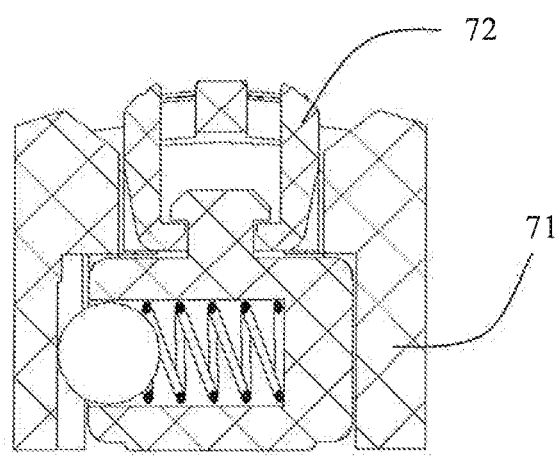
FIG. 6 is a cross sectional view of a structure shown in FIG. 4 of the present invention taken along line B-B.

Shown in FIG. 1 and FIG. 4, in this embodiment, similar to a clamp head of a normal wire stripping clamp in the prior art, the wire stripping component 3 includes a first clamp body 32 and a second clamp body 33 which are connected together by a first pivot shaft 31. Semicircular blades 34 and 35 corresponding to each other are provided on the first clamp body 32 and the second clamp body 33, respectively. When the first clamp body 32 and the second clamp body 33 are closed, semicircular blades 34 and 35 cooperate with each other to cut the outer insulation layer of the wire. In the present embodiment, multiple pairs of semicircular blades including semicircular blades 34 and 35 are provided on the first clamp body 32 and the second clamp body 33, respectively. These paired semicircular blades define multiple wire stripping holes of different sizes so as to form a working portion 30 of the wire stripping component 3, which may cut the insulation layers of wires of different specifications.

Shown in FIG. 2, the handle 2 is provided with an opening 22 corresponding to the wire stripping component 3. The size and position of opening 22 are corresponding to the working portion 30 formed by multiple pairs of semicircular blades on the wire stripping component 3, thereby allowing the wire to be stripped to enter into the wire stripping hole matching the specification thereof through the opening 22.

It should be noted that various known embodiments of the strippers in the prior art can be applied to the present invention. The present invention has no intention of a limitation thereto.

Shown in FIGS. 1, 2, 5, 7 and 8, this embodiment further includes a framework 4 fitted in the inner space 21 of the handle 2, and the shape of the framework 4 is arranged to match with the shape of inner space 21. A hook-shaped portion 41 is provided on the framework 4, and a recessed portion 23 is provided in the inner space 21 of the handle 2. When the framework 4 is inserted into the inner space 21 of the handle 2, the hook-shaped portion 41 and the recessed portion 23 secure the framework 4 in the inner space 21 by snap fit.

The framework 4 includes a first chamber 42 and a second chamber 43 therein. The first clamp body 32 and the second clamp body 33 are held in the first chamber 42 of the framework 4. A first pivot shaft hole 44, a fixing hole 45 and a thread guide hole 46 are provided on the side wall of the first chamber 42. The first pivot shaft 31 passes through the first pivot shaft hole 44. A connecting hole 36 aligned with the fixing hole 45 is provided on the second clamp body 33. A fixing pin passing through the connecting hole 36 and the fixing hole 45 fixes the second clamp body 33 to the framework 4. The size and position of the thread guide hole 46 are corresponding to multiple pairs of semicircular blades on the wire stripping component 3 and the opening 22 on the handle 2, allowing the wire to be stripped to pass therethrough.

Thereby wire stripping component 3 can be mounted in the inner space 21 of the handle 2 with the help of the framework 4. At this point the first clamp body 32 can be operated to open and close relative to the second clamp body 33, so as to cut the insulation layer of the wire to be stripped, which passes through the opening 22 of the handle 2 and the thread guide hole 46 of the framework 4.

Shown in FIGS. 1, 4, 9 and 10, this embodiment further includes a moving member 5 pivotably attached to the framework 4 about a second pivot shaft 51. In other embodiments, the moving member 5 can also be provided to be pivotably attached to the handle. In this embodiment, the second pivot shaft 51 and the first pivot shaft 31 are not coincident; the moving member 5 is provided with a cylindrical portion 52 and the first clamp body 32 is provided with a sliding groove 39 thereon. When the moving member 5 pivots about the second pivot shaft 51, the cylindrical portion 52 moves in the sliding groove 39, so as to allow the moving member 5 to pivotably move about the second pivot shaft 51 between a first position and a second position, and thereby drive the first clamp body 32 to pivot about the first pivot shaft 31 with the moving member 5 and to open and close relative to the second clamp body 33. When the moving member 5 is in the first position, the first clamp body 32 is in closed state; when the moving member 5 is in the second position, the first clamp body 32 is in open state.

It should be noted that, in another embodiment, the cylindrical portion 52 may be arranged on the first clamp body 32, and the sliding groove 39 is arranged on the moving member 5. In another embodiment, axes of the first pivot shaft 31 and the second pivot shaft 51 may be arranged to be coincident, at which point the connection between the moving member 5 and the first clamp body 32 can be in any form that allows the moving member 5 to drive the first clamp body 32, such as a fixed connection. Further, in other embodiments, the first clamp body 32 can be arranged independent to the second clamp body 33, such as the first clamp body 32 is not connected to the second clamp body 33 though the first pivot shaft 31; instead, the first clamp body 32 is fixedly attached to the moving member 5, at which point the first clamp body 32 pivots about the second pivot shaft 51 with the moving member 5 to open and close relative to the second clamp body 33, or the first clamp body 32 and the second clamp body 33 cooperate not by way of relative pivoting, but instead by way of relative translational movement, etc. The above way of implementing has the problem that the cooperation between the first clamp body 32 and the second clamp body 33 is prone to errors that affect the cutting results. Furthermore, the wire stripping component 3 requires a high level of precision—the size of the wire stripping hole needs to be consistent with the specification of the wire to be stripped to avoid situations where the stripping cannot be completed in one stripping action or where several strands or multiple strands of the inner wire are cut off. To ensure working precision of the wire stripping component 3, the wire stripping component 3 is preferably manufactured separately, and the first clamp body 32 and the second clamp body 33 are connected through the first pivot shaft 31, and the wire stripping component 3 that meets the precision requirement is integrally assembled into the handle 2. The aforementioned connection of the framework 4 and the handle 3 is a kind of integral assembly method of the wire stripping component 3, so as to not only be inconsistent with the production process but also to ensure the precision requirements of the product.

It can be seen most clearly from FIG. 1 that, in this embodiment, the handle 2 has variation in diameters, an outer surface 26 of which is designed to be known in the art as an ergonomic surface. When the moving member 5 pivots to a first position, i.e. the first clamp body 32 is in a closed state relative to the second clamp body 33, an outer surface 53 of the moving member 5 forms part of ergonomic outer surface 26 of the handle. At this point, the handle 2 of the screwdriver may have the same feel as using an ordinary screwdriver.

Shown in FIGS. 1, 4, 5, 11 and 12, in this embodiment, a torsion spring 6 is also provided to cooperate with the moving member 5. The torsion spring 6 is arranged to bias the moving member 5 to the second position. When the moving member 5 is under the action of the torsion spring 6, it pivots from the outer surface 53 of the handle 2 to the second position located outside of the outer surface 53 of the handle 2, and then drives the clamp body 32 open relative to the second clamp body 33; the wire stripping operation can then be conveniently proceeded by holding the handle tight to press down the moving member 5.

As shown in FIGS. 1 and 4, as in many screwdriver handles in the prior art, in the present embodiment, diameter of the handle 2 first gradually diminishes and then increases from one end adjacent rod 1, so as to have a thin portion 24 and a thick portion 25. The wire stripping component 3 has its width gradually increase from the first pivot shaft 31 so as to have a narrow portion 37 and a wide portion 38. Preferably, the narrow portion 37 of the wire stripping component 3 is placed in the inner space 21 in a position corresponding to the thin portion 24 of the handle 2; the wide portion 38 of the wire stripping component 3 is placed in the inner space 21 in a position corresponding to the thick portion 25 of the handle 2. In one hand, this can efficiently use the inner space 21 of the handle 21 so as to avoid the size of the handle 2 having to be designed too large due to the wire stripping component 3 being internally disposed. Further, in another embodiment that is not shown, multiple pairs of the semicircular blades are arrayed according to the distance therefrom to the first pivot shaft 31 in ascending order, so that the bigger the pair of semicircular blades the farther they are from the first pivot shaft 31 so that when the first clamp body 32 is opened, the bigger pair of semicircular blades have a greater distance therebetween, whereby the moving member 5 can pivot only a small angle to perform stripping operations on wires of larger specifications. On the other hand, the sliding groove 39 is preferably arranged on the first clamp body 32 remote from the first pivot shaft 3, so that the first clamp body 32 has a larger torque when it is closed, and the wide portion 38 of the wire stripping component 3 is remote from the first pivot shaft 31, so the sliding groove 39 may be preferably provided in the wide portion 38 of wire stripping component 3, and the position of the wide portion 38 of wire stripping component 3 is arranged to be corresponding to the thick portion 25 of the handle 2, and applying force to the thick portion 25 of the handle is more convenient and ergonomic for the person's hand.

Figure 7:
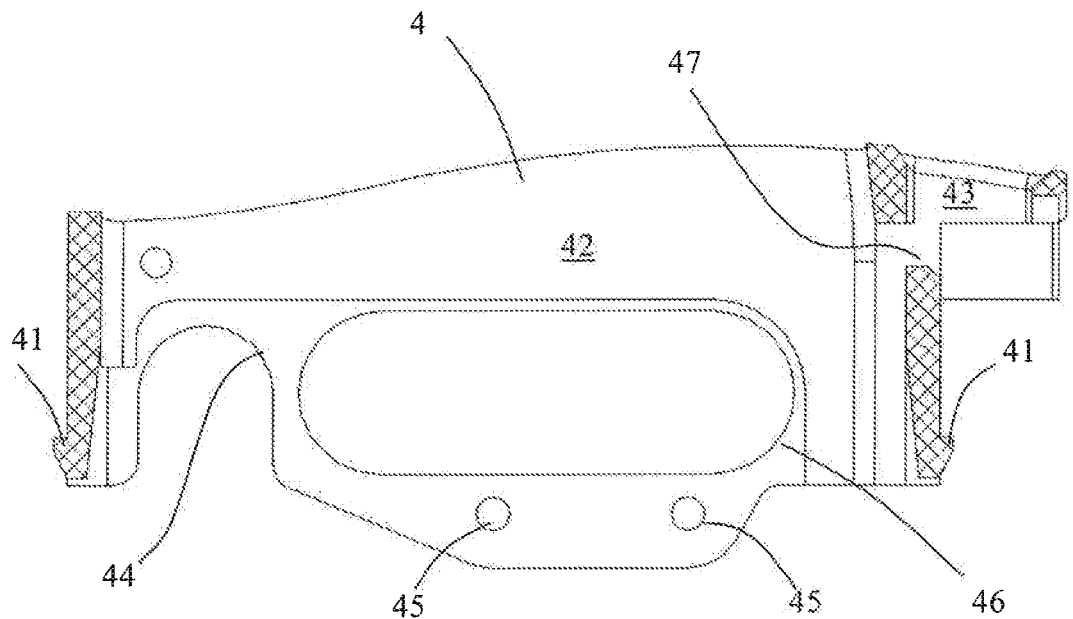
FIG. 7 is a cross sectional view of a framework according to the present invention.
Figure 8:
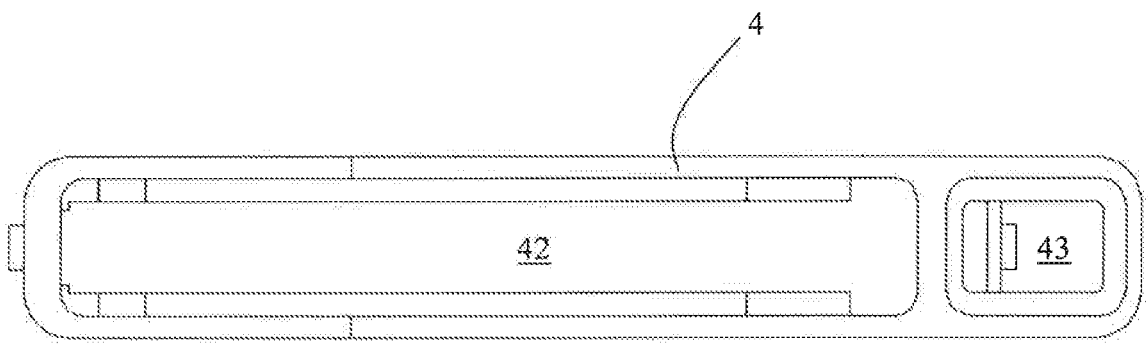
FIG. 8 is a plan view of the framework shown in FIG. 7 of the present invention.
Figure 9:
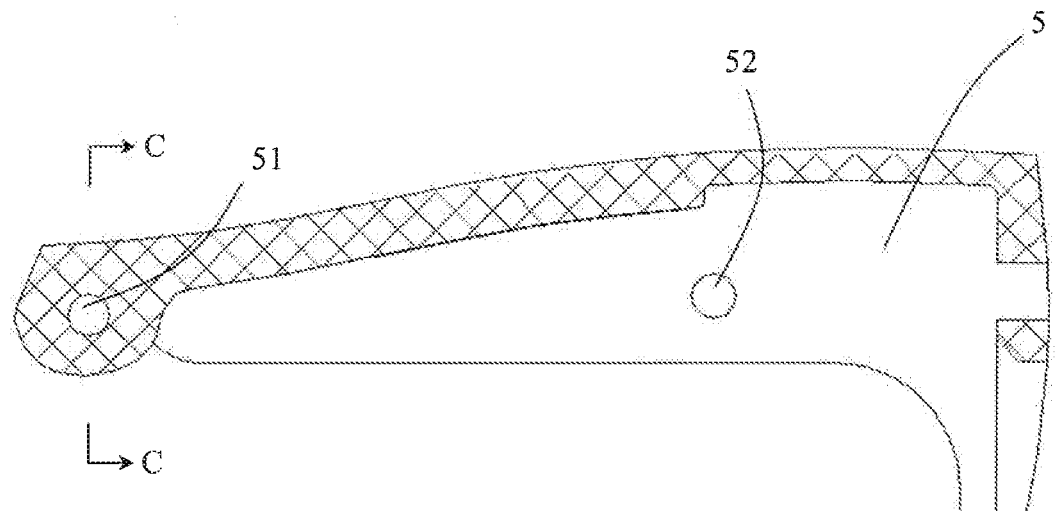
FIG. 9 is a cross sectional view of a moving member according to the present invention.
Figure 10:
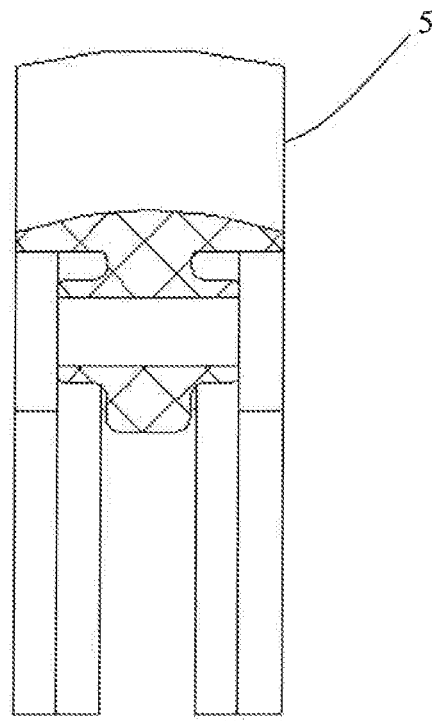
FIG. 10 is a cross sectional view of the clamp body shown in FIG. 9 of the present invention taken along line C-C.
Figure 11:
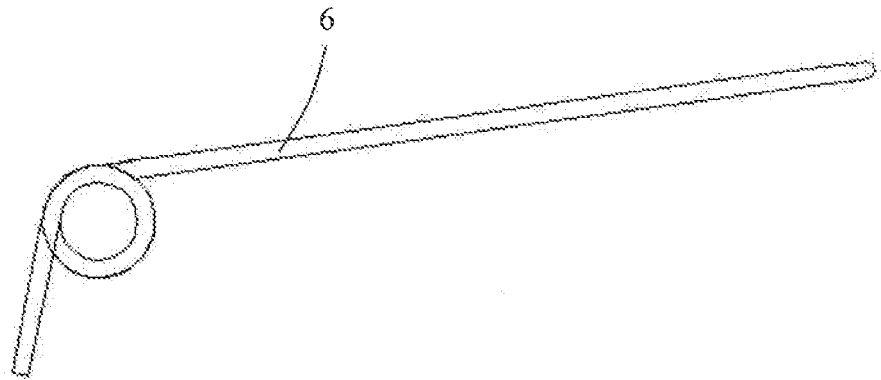
FIG. 11 is a cross sectional view of a torsion spring according to the present invention.
Figure 12:
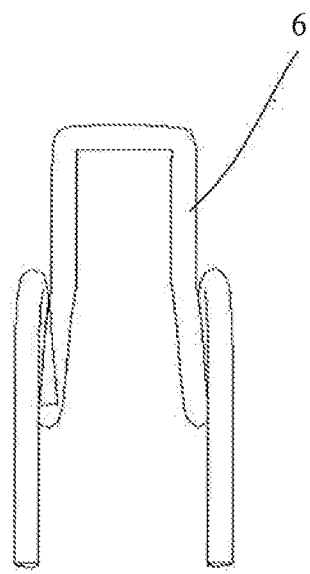
FIG. 12 is a side view of the torsion spring shown in FIG. 11 of the present invention.
Figure 13:
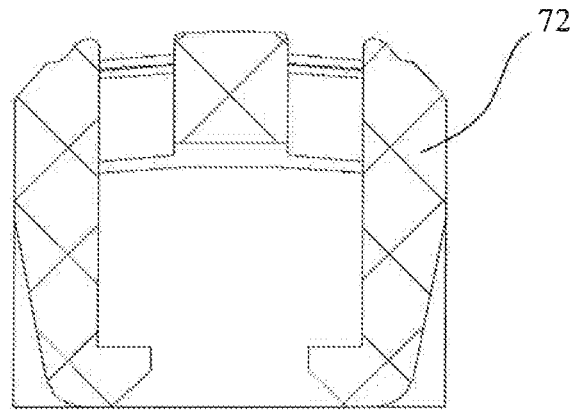
FIG. 13 is a cross sectional view of a push button according to the present invention.
Figure 14:
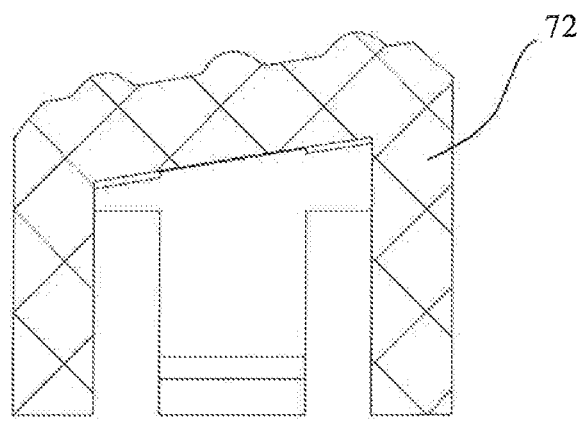
FIG. 14 is a cross sectional side view of the push button shown in FIG. 12 of the present invention.
Figure 15:
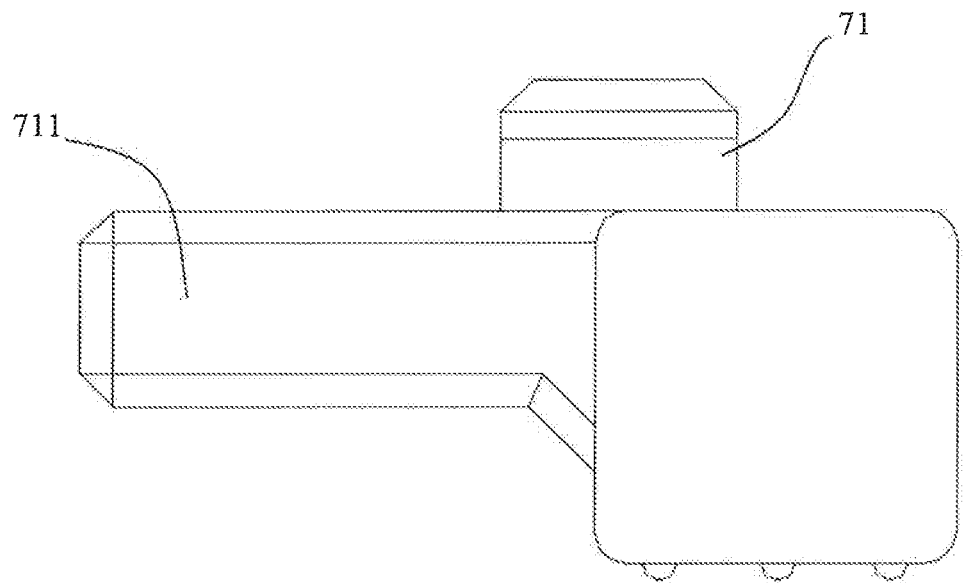
FIG. 15 a view of a locking portion according to the present invention.
Figure 16:
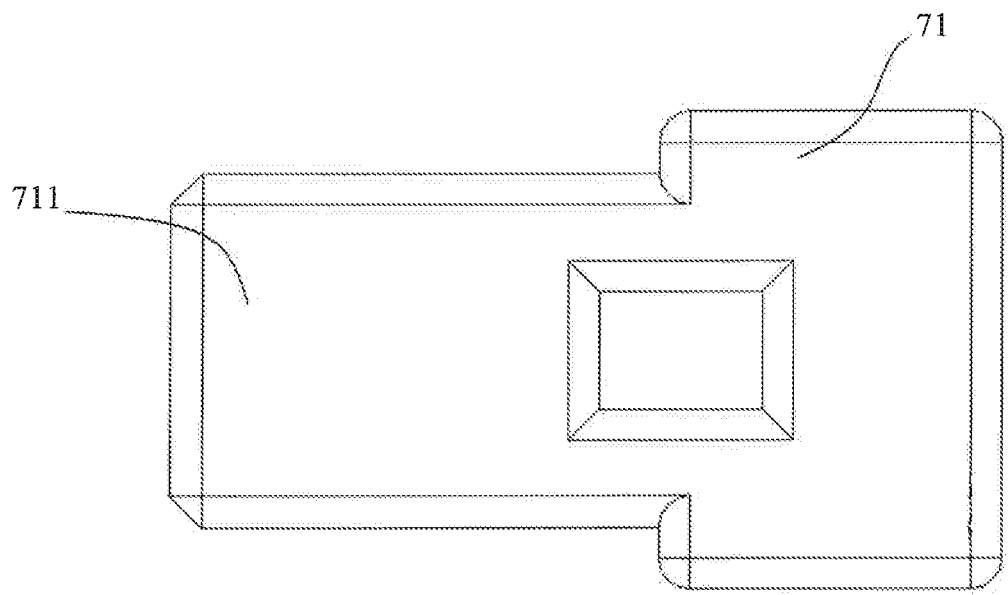
FIG. 16 is a plan view of the locking portion shown in FIG. 15 of the present invention.
Figure 17:
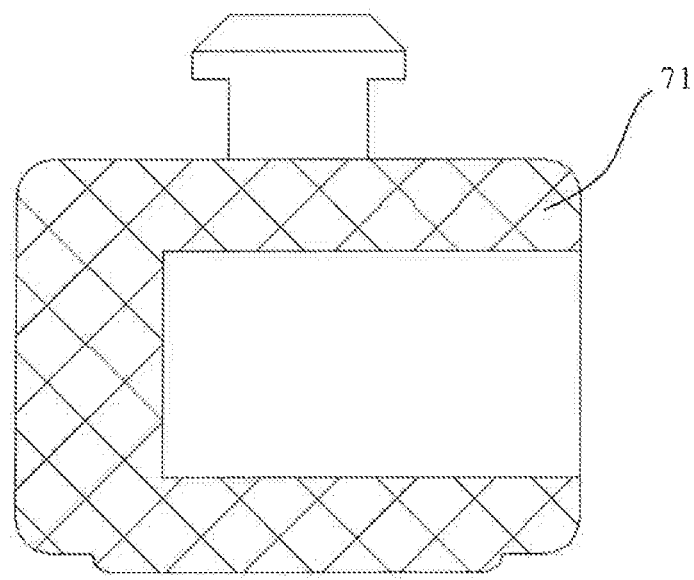
FIG. 17 is a cross sectional view of the locking portion shown in FIG. 15 of the present invention.

Shown in FIGS. 1 and 4, the present embodiment further includes a locking component 7. The locking component 7 is held in a second chamber 43 of the framework 4. There is a passage 47 between the second chamber 43 and the first chamber 42 as shown in FIG. 7. The locking component 7 includes a locking portion 71 and a push button 72, shown in FIGS. 6 and 13-17. The locking portion 71 has a projection 711 thereon. The moving member 5 is provided with a locking hole 54 which can cooperate with the projection 711. When pushing the push button 72 so that the projection 711 passes through the passage 47 and extends into the locking hole 54 of the moving member 5, the moving member 5 is locked in the second position and the first clamp body 32 is closed, the outer surface 26 of the moving member 5 forming part of the outer surface 53 of the handle 2. When pushing the push button 72 so that the projection 711 exits from the locking hole 54, under the biasing force of the torsion spring 6, the moving member 5 pivots out from the outer surface 53 of the handle 2 and the first clamp body 32 is opened, cutting can be performed by pressing down the moving member 5.

Shown in FIGS. 6 and 13-17, the locking portion 71 is provided with a T-shaped column on the upper surface thereof. The push button 72 has four pawls, wherein the ends of claws at both sides are provided with barbs, four pawls define a square, a T-shaped column fits into the square defined by pawls, and barbs hook onto T-shaped pillars. The upper surface of push button 72 is an inclined surface provided with projecting lines. The locking portion 71 is provided with a circular blind hole on the side wall thereof. The blind hole is provided with a spring and a steel ball therein, one end of the spring contacts with the bottom of the blind hole, and the other end of the spring contacts the steel ball. The spring pushes the steel ball to bear against the side wall of the locking portion 71, increasing the resistance to the sliding of locking portion 71 to prevent locking member 7 from automatically locking or unlocking.

The foregoing described the preferred embodiments of the present invention. It should be understood that an ordinary one skilled in the art can make many modifications and changes according to the concept of the present invention without creative work. Therefore, any technical solutions obtained by a person skilled in the art depending on this technical concept according to this invention on the basis of the prior art through logical analysis, reasoning or limited experimental, should fall in the protection scope determined by the claims.

What is claimed is:

1. A screwdriver, comprising:
   a handle;
   a wire stripping component disposed inside said handle; and
   a moving member;
   wherein said handle is provided with an opening corresponding to a working portion of said wire stripping component;
   wherein said wire stripping component comprises a first clamp body and a second clamp body cooperating with each other, said first clamp body and said second clamp body are connected together by a first pivot shaft;
   wherein said moving member is connected to said first clamp body, and said moving member is disposed to pivot about a second pivot shaft between a first position and a second position so that said first clamp body pivots about said first pivot shaft
   wherein when said moving member is in said first position, said first clamp body and said second clamp body are closed;
   wherein when said moving member is in said second position, said first clamp body and said second clamp body are open.

2. The screwdriver of claim 1, wherein an axis of said first pivot shaft and an axis of said second pivot shaft are coincident.

3. The screwdriver of claim 1, wherein an axis of said first pivot shaft and an axis of said second pivot shaft are not coincident.

4. The screwdriver of claim 3, wherein said moving member is provided with a cylindrical portion, said first clamp body is provided with a sliding groove, said moving member and said first clamp body are connected through said cylindrical portion and said sliding groove, and said sliding groove is arranged such that said cylindrical portion can move in said sliding groove to allow said moving member to pivot about said second pivot shaft.

5. The screwdriver of claim 4, wherein said sliding groove is arranged on said first clamp body away from said first pivot shaft.

6. The screwdriver of claim 1, further comprising a torsion spring, wherein said torsion spring is arranged to bias said moving member to said second position.

7. The screwdriver of claim 1, wherein when said moving member is in said first position, an outer surface of said moving member is part of an outer surface of said handle.

8. The screwdriver of claim 7, wherein the outer surface of said handle is a curved surface.

9. The screwdriver of claim 7, wherein when said moving member is in said second position, and at least a part of said moving member is projecting beyond the outer surface of said handle.

10. The screwdriver of claim 1, wherein said handle has a thin portion and a thick portion, said wire stripping component has a narrow portion and a wide portion, and the narrow portion of said wire stripping component is provided at the thin portion of said handle, and the wide portion of said wire stripping component is provided at the thick portion of said handle.

11. The screwdriver of claim 10, wherein said thin portion of said handle is at a side of a head of said handle, said thick portion is at a side of a tail of said handle; the narrow portion of said wire stripping component is at a side of said first pivot shaft, said wide portion is at a free end side of said wire stripping component.

12. The screwdriver of claim 4, wherein said handle has a thin portion and a thick portion, said wire stripping component has a narrow portion and a wide portion, and the narrow portion of said wire stripping component is provided at the thin portion of said handle, the wide portion of said wire stripping component is provided at the thick portion of said handle, said thin portion of said handle is at a side of a head of said handle, and said thick portion is at a side of a tail of said handle; the narrow portion of said wire stripping component is at a side of said first pivot shaft, said wide portion is at a free end side of said wire stripping component, and said sliding groove is provided at said wide portion of said wire stripping component.

13. The screwdriver of claim 1, further comprising a locking component for locking said moving member in said first position.

14. The screwdriver as claimed in claim 1, wherein said working portion comprises one or multiple pairs of semicircular blades provided on said first clamp body and said second clamp body.

15. The screwdriver as claimed in claim 1, wherein said working portion comprises multiple pairs of semicircular blades of different sizes provided on said first clamp body and said second clamp body, and said semicircular blade closer to said first pivot shaft has a larger size.

16. A screwdriver, comprising:
a handle having a wire stripping component; and
a framework;
wherein said framework comprises a first chamber, said wire stripping component is held in said first chamber, said handle has an inner space;
wherein said framework is snap-fitted in said inner space of said handle, and openings are provided on side walls of said handle and said framework, respectively, corresponding to a working portion of said wire stripping component.

17. The screwdriver of claim 16, wherein said wire stripping component comprises a first clamp body and a second clamp body cooperating with each other, and said first clamp body and said second clamp body are connected together by a first pivot shaft.

18. The screwdriver of claim 17, wherein said handle comprises a moving member, said moving member is connected to said first clamp body, said moving member is disposed to pivot about a second pivot shaft between a first position and a second position so that said first clamp body pivots about said first pivot shaft;
wherein when said moving member is in said first position, said first clamp body and said second clamp body are closed;
wherein when said moving member is in said second position, said first clamp body and said second clamp body are open.

19. The screwdriver of claim 18, wherein said moving member is provided with a cylindrical portion, said first clamp body is provided with a sliding groove, said moving member and said first clamp body are connected through said cylindrical portion and said sliding groove, and said sliding groove is arranged such that said cylindrical portion can move in said sliding groove to allow said moving member to pivot about said second pivot shaft.

20. The screwdriver of claim 19, further comprising a torsion spring, wherein said torsion spring is arranged to bias said moving member to said second position.

21. The screwdriver of claim 20, wherein said framework further comprises a second chamber and a locking component, said locking component is held in said second chamber for locking said moving member in said first position.

22. A screwdriver, comprising:
a handle having a wire stripping component provided therein;
wherein said wire stripping component comprises a first clamp body and a second clamp body cooperating with each other;
wherein said handle further comprises a moving member, said moving member can move between a first position and a second position so that said first clamp body and said second clamp body are closed and opened;
wherein when said moving member is in said first position, said first and second clamp body clamp body are closed;
wherein when said moving member is in said second position, said first clamp and said second clamp body are opened;
wherein when said moving member is in said first position, an outer surface of said moving member is part of an outer surface of said handle.

23. The screwdriver of claim 22, wherein the outer surface of said handle is curved.

24. The screwdriver of claim 23, wherein when said moving member is in said second position, and at least a part of said moving member is projecting beyond the outer surface of said handle.

25. The screwdriver of claim 24, further comprising a torsion spring, said torsion spring is arranged to bias said moving member to said second position.

26. The screwdriver of claim 25, further comprising a locking component for locking said moving member in said first position.

* * * * *